(12) United States Patent
Kim

(10) Patent No.: US 11,912,362 B2
(45) Date of Patent: Feb. 27, 2024

(54) BICYCLE SADDLE

(71) Applicant: HUAN CO., LTD., Chuncheon-si (KR)

(72) Inventor: Yong Joo Kim, Chuncheon-si (KR)

(73) Assignee: Huan Co., Ltd., Chuncheon-si (KR)

( * ) Notice: Subject to any disclaimer, the term of this patent is extended or adjusted under 35 U.S.C. 154(b) by 0 days.

(21) Appl. No.: 17/619,926

(22) PCT Filed: Jul. 1, 2020

(86) PCT No.: PCT/KR2020/008615
§ 371 (c)(1),
(2) Date: Dec. 16, 2021

(87) PCT Pub. No.: WO2021/020748
PCT Pub. Date: Feb. 4, 2021

(65) Prior Publication Data
US 2022/0355878 A1 Nov. 10, 2022

(30) Foreign Application Priority Data
Jul. 30, 2019 (KR) .......................... 10-2019-0092355

(51) Int. Cl.
*B62J 1/02* (2006.01)
*B62J 1/00* (2006.01)

(52) U.S. Cl.
CPC ............... *B62J 1/007* (2013.01); *B62J 1/002* (2013.01); *B62J 1/005* (2013.01)

(58) Field of Classification Search
CPC ............. B62J 1/007; B62J 1/002; B62J 1/005
See application file for complete search history.

(56) References Cited

U.S. PATENT DOCUMENTS 576,192 A * 2/1897 Hoyt .................. B62J 1/005
297/201
621,895 A * 3/1899 Brodie ................ B62J 1/005
297/201
(Continued)

FOREIGN PATENT DOCUMENTS

EP 1813514 A2 8/2007
GB 189610187 A 3/1897
(Continued)

OTHER PUBLICATIONS

PCT International Search Report and Written Opinion for PCT International Application No. PCT/KR2020/008615 dated Sep. 25, 2020, 9 pages, including English translation of the PCT International Search Report.

(Continued)

*Primary Examiner* — Philip F Gabler
(74) *Attorney, Agent, or Firm* — Blank Rome LLP

(57) ABSTRACT

The present invention relates to a bicycle saddle including: a saddle frame disposed on a bicycle frame; a saddle plate disposed on top of the saddle frame; and a saddle seat disposed on top of the saddle plate to elastically support the hips, wherein the saddle seat is divided into a first seat and a second seat having top portions rounded with a given radius of curvature and disposed spaced apart from each other to a band-like shape along both longitudinal edges of the saddle plate, and between the first seat and the second seat is disposed an arch-shaped ischium accommodation portion for accommodating the ischial tuberosities of the pelvis thereinto to prevent the arteries, veins, and nerves from a rider's anus to the genitals from being compressed against the saddle seat by his or her body weight. Accordingly, the anus and genitals as well as the arteries, veins, and nerves connected from the anus to the genitals can be basically prevented from being compressed against the (Continued)

saddle seat, thereby permitting the rider to be free of perineum pains, prostate diseases, and dysuria.

5 Claims, 5 Drawing Sheets

(56) References Cited

U.S. PATENT DOCUMENTS

| | | | |
|---|---|---|---|
| 628,704 A | 7/1899 | Gates | |
| 5,873,626 A | 2/1999 | Katz | |
| D407,910 S | 4/1999 | Terry | |
| D416,394 S | 11/1999 | Minkow et al. | |
| D416,695 S | 11/1999 | Minkow et al. | |
| D429,573 S | 8/2000 | Bontrager | |
| D429,907 S | 8/2000 | Minkow et al. | |
| 6,106,059 A | 8/2000 | Minkow et al. | |
| D430,413 S | 9/2000 | Minkow et al. | |
| D431,919 S | 10/2000 | Bontrager | |
| D431,920 S | 10/2000 | Goldstein | |
| D433,827 S | 11/2000 | Kuipers | |
| D434,235 S | 11/2000 | Kuipers | |
| 6,149,230 A | 11/2000 | Bontrager | |
| 6,224,151 B1 | 5/2001 | McMullen, Jr. | |
| D454,258 S | 3/2002 | Yates | |
| D456,157 S | 4/2002 | Yates | |
| 6,402,235 B1* | 6/2002 | Letendre | B62J 1/005 |
| | | | 297/195.1 |
| 6,402,236 B1 | 6/2002 | Yates | |
| D590,160 S | 4/2009 | Hung | |
| 7,628,451 B2* | 12/2009 | Chuang | B62J 1/005 |
| | | | 297/215.14 |
| D707,046 S | 6/2014 | Huang | |
| D739,153 S | 9/2015 | Kurata | |
| 9,233,725 B2 | 1/2016 | Marcel | |
| D754,449 S | 4/2016 | Lam | |
| D756,675 S | 5/2016 | Toll | |
| D760,507 S | 7/2016 | Marcel | |
| D764,820 S | 8/2016 | Toll et al. | |
| D764,821 S | 8/2016 | Toll | |
| D769,007 S | 10/2016 | Toll | |
| D769,008 S | 10/2016 | Toll | |
| D774,790 S | 12/2016 | Toll | |
| D784,033 S | 4/2017 | Li | |
| D786,573 S | 5/2017 | Toll | |
| D787,210 S | 5/2017 | Schwary | |
| D787,211 S | 5/2017 | Schwary | |
| D787,212 S | 5/2017 | Schwary | |
| 9,637,193 B1 | 5/2017 | Porter et al. | |
| 9,663,166 B2* | 5/2017 | Hamel | B62J 1/007 |
| D802,947 S | 11/2017 | Toll | |
| D802,948 S | 11/2017 | Toll | |
| D846,896 S | 4/2019 | Hain | |
| D846,897 S | 4/2019 | Toll | |
| D846,899 S | 4/2019 | Toll | |
| D875,411 S | 2/2020 | Bigolin | |
| D887,731 S | 6/2020 | Kim | |
| D903,348 S | 12/2020 | Toll | |
| D904,049 S | 12/2020 | Toll | |
| D905,982 S | 12/2020 | Petty | |
| D919,313 S | 5/2021 | Kim | |
| 2007/0200399 A1 | 8/2007 | Riondato | |
| 2009/0079237 A1 | 3/2009 | Riondato | |
| 2011/0193376 A1* | 8/2011 | Cha | B62J 1/007 |
| | | | 297/214 |
| 2013/0313870 A1 | 11/2013 | Riondato | |
| 2014/0145479 A1 | 5/2014 | Li | |
| 2015/0175228 A1 | 6/2015 | Yu | |
| 2016/0137245 A1 | 5/2016 | Schiavon et al. | |
| 2016/0368554 A1 | 12/2016 | Rizzato et al. | |
| 2017/0274950 A1 | 9/2017 | Holt et al. | |
| 2019/0061850 A1* | 2/2019 | Sung | B62J 1/002 |
| 2020/0079454 A1* | 3/2020 | Kim | B62J 1/00 |

FOREIGN PATENT DOCUMENTS

| | | |
|---|---|---|
| KR | 2019990039142 U | 11/1999 |
| KR | 200360712 Y1 | 9/2004 |
| KR | 1020100116740 A | 11/2010 |
| KR | 3009508390000 | 3/2018 |
| KR | 3009715730001 | 8/2018 |
| KR | 3009715730002 | 8/2018 |
| KR | 3009715730003 | 2/2019 |
| KR | 102109534 B1 | 5/2020 |
| WO | 2006015731 A1 | 2/2006 |
| WO | 2015059626 A1 | 4/2015 |

OTHER PUBLICATIONS

Design U.S. Appl. No. 29/762,034, filed Dec. 14, 2020 by the Applicant, "Huan Co., Ltd." entitled "Bicycle Saddle" (7 pages).
Design U.S. Appl. No. 29/836,013, filed Apr. 22, 2022 by the Applicant, "Huan Co., Ltd." entitled "Bicycle Saddle" (7 pages).

\* cited by examiner (a)

B-B (b)

BICYCLE SADDLE

CROSS-REFERENCE TO RELATED APPLICATIONS

This application is a U.S. National Phase entry under 35 U.S.C. 371 which claims priority to PCT International Patent Application No. PCT/KR2020/008615 filed on Jul. 1, 2020 which claims priority to Korean Patent Application No. 10-2019-0092355 filed on Jul. 30, 2019, the entire disclosures of which are incorporated by reference herein

TECHNICAL FIELD

The present invention relates to a bicycle saddle, and more specifically, to a bicycle saddle that is capable of providing an ischium accommodation portion for accommodating the ischial tuberosities located on the lower part of the pelvis thereinto to basically prevent a rider's blood vessels and nerves connecting his or her anus and genitals from being compressed thereagainst.

BACKGROUND ART

As people in modern society have had a lot of interests in their leisure life and health, demands and uses for bicycles have been increased, and accordingly, it is common that they enjoy various leisure activities using bicycles, such as climbing, hiking, and the like.

As shown in FIG. 1, a bicycle rider sits on a saddle 20 mounted on a bicycle 10 and rides the bicycle 10, and the saddle 20 is generally constituted of a cushion member like a sponge and a spring to provide a comfortable seating feeling and to absorb impacts generated during riding.

Generally, the conventional bicycle saddle 20 has the shape of a general triangle in consideration of the hips and a width between the legs open during riding, and in a process of pedaling a bicycle, accordingly, the genitals and perineum are compressed against a sharp nose portion of the saddle, thereby providing pains to every rider. In specific, if frictions are caused by riding and impacts are generated by irregular road surfaces, serious pains of the scrotum, prostate, and perineum may occur.

Accordingly, the rider using the conventional bicycle saddle 20 seriously suffers from sexual dysfunction caused by sexual anesthesia and dysuria due to continuous compression of the genitals and perineum.

For example, it is announced that Irwin Goldstein, Professor of Urology in Boston university medical school of U.S.A. recently mentions in an annual conference of U.S.A. society of Urology that men bike cycling players are exposed to remarkably higher clitoris dysfunction dangers than general track-and-field athletes and as compression is applied to blood vessels and nerves existing in the perineum, the players suffer from sexual dysfunction and dysuria. Further, it is announced that 4% of patients with impotence are related to bicycle riding.

Degrees of sexual dysfunction and dysuria are dependent on the rider's riding postures, and in specific, in the case of a racing bicycle (called cycling bicycle) whose handle is located lower than a saddle, the rider's upper body is much bent down to cause an angle between his or her spine and the saddle to become small, so that the genitals and perineum are extremely compressed against the saddle, which increases the number of patients with impotence.

So as to suppress the genitals and perineum from being compressed against the saddle, recently, a bicycle saddle is disclosed in U.S. Pat. No. 8,668,259 (hereinafter referred to as Prior art 1).

According to Prior art 1, the conventional bicycle saddle includes saddle parts for supporting left and right ischial tuberosities of the pelvis, respectively, seat rails coupled to a bicycle frame, and a seat movable along the seat rails in up and down directions.

The saddle parts have rectangular shapes for supporting the ischial tuberosities of the pelvis, respectively, in a state of removing a nose portion.

According to Prior art 1, the saddle whose nose portion is removed is provided to minimize contact areas of the genitals and perineum therewith, thereby suppressing pains of the genitals and perineum from occurring, but as the blood vessels and nerves connecting the genitals and the perineum are compressedly maintained through the ischial tuberosities, sexual dysfunction and dysuria are still caused.

Moreover, the saddle whose nose portion is removed rotates by a given range in up and down directions according to the rider's repeated pedaling operations, and accordingly, the saddle fails to stably support the rider's hips, thereby increasing his or her fatigue.

So as to suppress the perineum from being compressed against the saddle, further, another conventional bicycle saddle is disclosed in Korean Patent Application No. 2016-0033170 (hereinafter referred to as Prior art 2).

According to Prior art 2, the conventional bicycle saddle includes two same regions arranged symmetrically with respect to a longitudinal axis and a channel open from top of the longitudinal axis to bottom thereof to separate the two regions from the middle portion thereof to the front portion thereof.

Further, the channel has a concave portion formed on the rear side of the middle portion thereof to prevent the anus from coming into contact with the saddle.

According to Prior art 2, the bicycle saddle includes the channel and the concave portion adapted to prevent the anus and perineum from coming into contact therewith, but as the blood vessels and nerves connecting the anus, perineum, and genitals are compressedly maintained through the ischial tuberosities, sexual dysfunction and dysuria are not solved at all.

PRIOR ART DOCUMENTS (Patent document 1) U.S. Pat. No. 8,668,259 (on Mar. 11, 2014, Prior art 1)
(Patent document 2) Korean Patent Application No. 2016-0033170 (on Mar. 25, 2016, Prior art 2)
(Patent document 3) International Patent Application No. WO1999/042353 (on Aug. 26, 1999)
(Patent document 4) Korean Patent No. 1638118 (on Jul. 4, 2016)
(Patent document 5) Korean Patent No. 1510707 (on Apr. 3, 2015)
(Patent document 6) Korean Patent Application No. 2018-0108634 (on Oct. 4, 2018)

DISCLOSURE

Technical Problem

Accordingly, the present invention has been made in view of the above-mentioned problems occurring in the related art, and it is an object of the present invention to provide a bicycle saddle that is capable of providing an ischium accommodation portion for accommodating the ischial tuberosities located on the lower part of the pelvis thereinto to basically prevent a rider's blood vessels and nerves connecting his or her anus and genitals from being compressed thereagainst.

Technical Solution

To accomplish the above-mentioned object, according to the present invention, there is provided a bicycle saddle including: a saddle frame disposed on a bicycle frame; a saddle plate disposed on top of the saddle frame; and a saddle seat disposed on top of the saddle plate to elastically support the hips, wherein the saddle seat is divided into a first seat and a second seat having top portions rounded with a given radius of curvature, and the first seat and the second seat are disposed spaced apart from each other along the width direction of the saddle seat, and between the first seat and the second seat is disposed an arch-shaped ischium accommodation portion for accommodating the ischial tuberosities of the pelvis thereinto to prevent the arteries, veins, and nerves from a rider's anus to the genitals from being compressed against the saddle seat by his or her body weight.

The saddle seat may include, between the first seat and the second seat, a ventilation portion for communicating with the ischium accommodation portion and allowing external air to flow therethrough and a gap for preventing the coccyx from coming into contact therewith.

The first seat and the second seat have straight line portions reduced gradually in width toward ends thereof from the ischium accommodation portion to thus form the ventilation portion therebetween, and the ends of the straight line portions are bent downwardly.

The bicycle saddle may further include ischial tuberosity contacting portions formed on one side of the ischium accommodation portion, respectively, to increase contact areas of the first seat and the second seat with the rear sides of the ischial tuberosities, the ischial tuberosity contacting portions being inclinedly formed toward the bottom of the saddle plate from tops of the first seat and the second seat.

Each ischial tuberosity contacting portion occupies an area less than or equal to % of the space area of the corresponding ischium accommodation portion and has a plurality of holes punched on the surfaces thereof.

The first seat and the second seat have the rounded top portions with the shape of a semicircular curved arch and fastening parts formed on the undersides thereof, respectively, to be detachably coupled correspondingly to the saddle plate, each fastening part having a pair of fastening protrusions protruding downwardly from both sides of the underside of each seat and a fastening groove formed between the fastening protrusions.

Advantageous Effects

According to the present invention, the bicycle saddle is configured to have the arch-shaped ischium accommodation portion formed on the saddle seat with the first seat and the second seat to accommodate the ischial tuberosities of the pelvis thereinto, and accordingly, the anus and genitals as well as the arteries, veins, and nerves connected from the anus to the genitals can be basically prevented from being compressed against the saddle seat, thereby permitting a rider to be free of perineum pains, prostate diseases, and dysuria.

Additionally, the bicycle saddle according to the present invention is configured to allow the saddle seat to be divided into the first seat and the second seat spaced apart from each other, and accordingly, if any one of the first seat and the second seat is deformed and damaged, the deformed and damaged seat is conveniently exchanged with new one, thereby efficiently reducing a maintenance cost.

Moreover, the bicycle saddle according to the present invention is configured to have the ischial tuberosity contacting portions formed on one side of the ischium accommodation portion formed between the first seat and the second seat to safely and comfortably support the rider's hips.

In addition, the bicycle saddle according to the present invention is configured to have the saddle plate with the openings formed thereon to communicate with the ischium accommodation portion in up and down directions, so that the openings allow air to flow well therethrough to thus provide high ventilation effectiveness and quickly discharge rainwater from the saddle to the outside, without permitting the rainwater to stay on the saddle.

MODE FOR INVENTION

Figure 1:
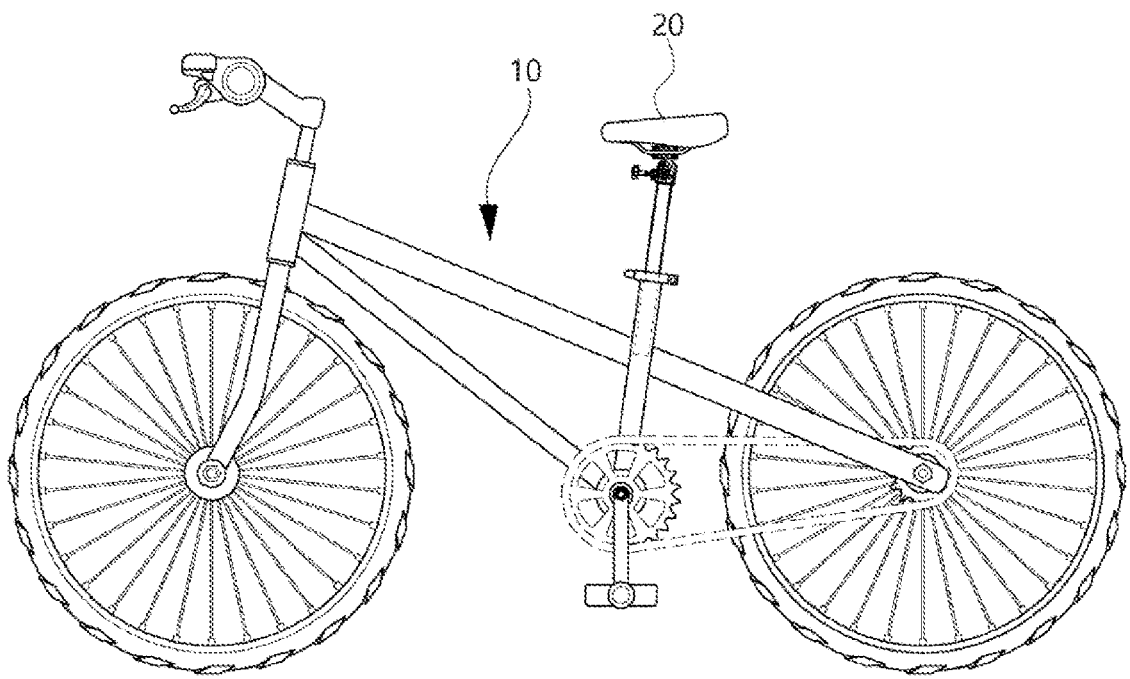
FIG. 1 is an exemplary view showing a conventional bicycle saddle.

Hereinafter, an explanation on a bicycle saddle according to the present invention will be given in detail with reference to the attached drawings.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

Hereinafter, the present invention will be explained in detail with reference to FIGS. 2 to 6b.

As shown, a bicycle saddle according to the present invention includes a saddle frame 100 disposed on a bicycle frame, a saddle plate 200 disposed on top of the saddle frame 100, and a saddle seat 300 disposed on top of the saddle plate 200 to elastically support the hips.

First, the saddle frame 100, which is detachably mounted on the bicycle frame, is a base structure having a first frame 100a and a second frame 100b made of steel to stably support the saddle plate 200 as will be discussed later.

In specific, the saddle frame 100 includes the first frame 100a and the second frame 100b formed by bending a central portion of a steel wire with a given thickness and length, and the bent portions and both ends of the saddle frame 100 are coupled to one side of the saddle plate 200 and the other side, respectively. Further, the saddle frame 100 has coupling portions (not shown) formed on given longitudinal points to be thus inserted into the bicycle frame.

The saddle plate 200 is disposed on top of the saddle frame 100 and made of hard synthetic resin to a shape whose one side is large and the other side is small so that the saddle plate 200 stably supports a rider's hips and allows the rider to gently pedal a bicycle.

According to the present invention, further, the saddle plate 200 has a pair of openings 210 formed thereon to communicate with an ischium accommodation portion 301 as will be discussed later in up and down directions.

In this case, the openings 210 are desirably formed on one side of the saddle plate 200 and the other side with respect to a longitudinal central portion of the saddle plate 200, respectively.

Figure 2:
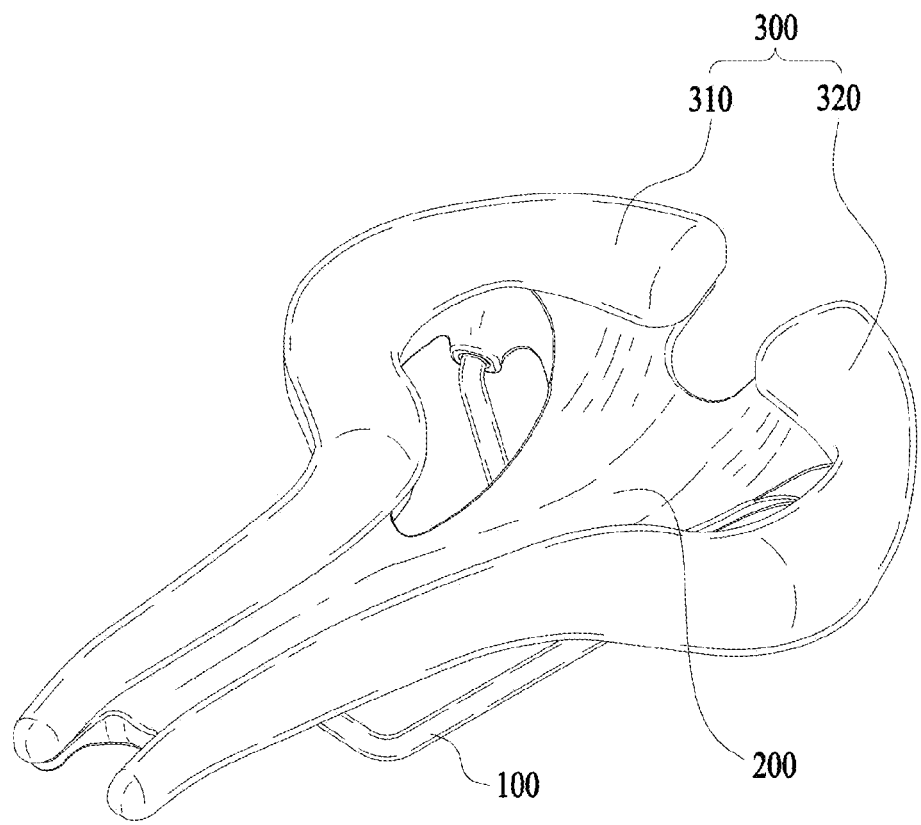
FIG. 2 is a perspective view showing a bicycle saddle according to an embodiment of the present invention.
Figure 3:
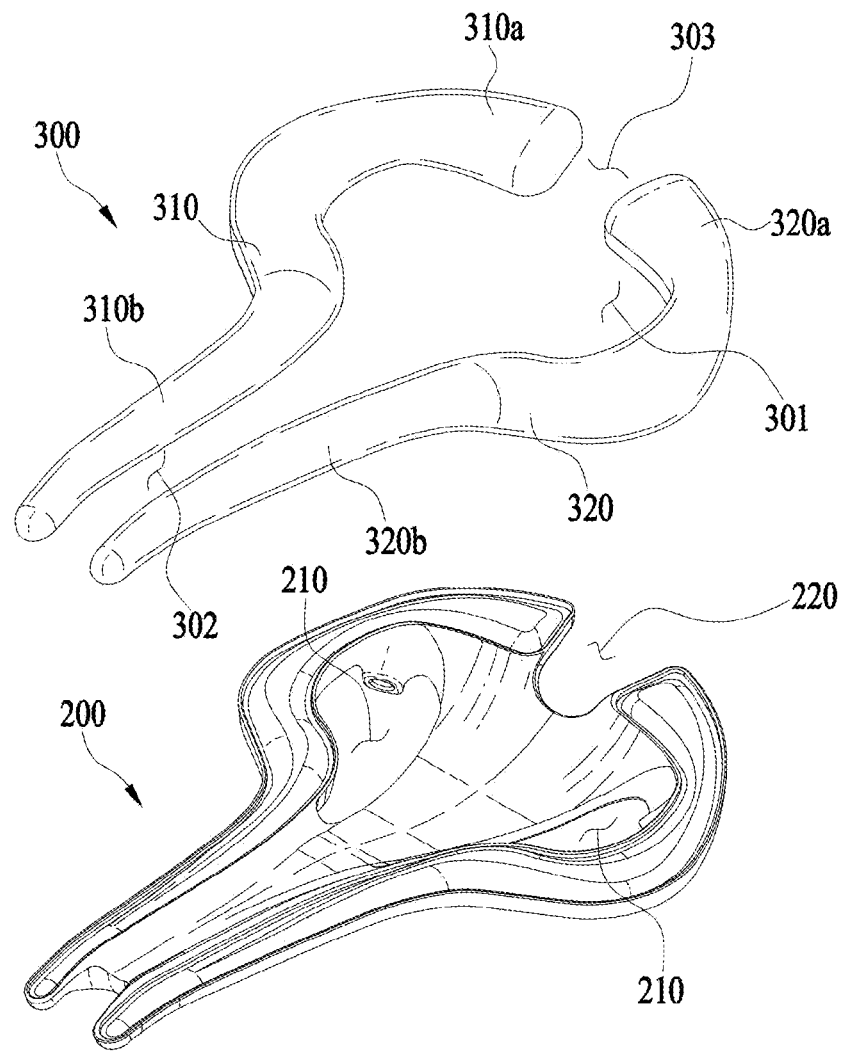
FIG. 3 is an exploded perspective view showing the bicycle saddle of FIG. 2.
Figure 3:
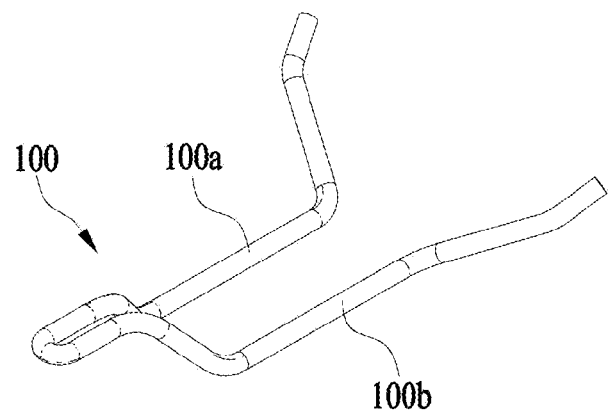

The openings 210 allow air to flow well therethrough to thus provide high ventilation effectiveness and quickly discharge rainwater from the saddle to the outside, without permitting the rainwater to stay on the saddle. As shown in FIGS. 2 and 3, the rear end part of the saddle plate 200 comprises a concave groove 220 communicating with the gap 303 in the vertical direction to prevent the coccyx from coming into contact with the the saddle plate 200.

The saddle seat 300 is disposed on top of the saddle plate 200 and serves to elastically and comfortably support the rider's hips.

In specific, the saddle seat 300 serves to minimize the impact applied to the rider's hips.

To do this, the saddle seat 300 is desirably made of compressed urethane or silicone. According to the present invention, the saddle seat 300 is divided into a first seat 310 and a second seat 320 having top portions rounded with a given radius of curvature. The first seat 310 and a second seat 320 are disposed spaced apart from each other along the width direction of the saddle seat 300. The first seat 310 and the second seat 320 each extend along edges of both sides of the saddle plate 200.

Further, between the first seat 310 and the second seat 320 is disposed the ischium accommodation portion 301 for accommodating the ischial tuberosities P of the pelvis thereinto to the shape of an arch to prevent the arteries, veins, and nerves from the rider's anus to the genitals from being compressed against the saddle seat 300 by his or her body weight.

That is, through the formation of the ischium accommodation portion 301 between the first seat 310 and the second seat 320, the other region except the outer surfaces of the ischial tuberosities P of the rider does not come into contact with the saddle seat 300, and accordingly, the arteries, veins, and nerves from the rider's anus to the genitals can be basically prevented from being compressed against the saddle seat 300, thereby allowing the rider to be free of pain of the perineum, prostate diseases, and dysuria.

In specific, when viewed on plane, the first seat 310 and the second seat 320 have arch portions 310a and 320a with a semicircular curved section bent outwardly and then inwardly and straight line portions 310b and 320b straightly extending to a given length from the arch portions 310a and 320a.

That is, the first seat 310 and the second seat 320 with the arch portions 310a and 320a and the straight line portions 310b and 320b have a generally hook-like shape. According to the present invention, the saddle seat 300 is divided into the first seat 310 and the second seat 320 spaced apart from each other and disposed on the saddle plate 200, so that if any one of the first seat 310 and the second seat 320 is deformed and damaged, the deformed and damaged seat is conveniently exchanged with new one, thereby efficiently reducing a maintenance cost.

Moreover, the ends of the straight line portions 310b and 320b are bent downwardly.

This prevents one leg of the rider in a process of getting on or off the bicycle from lockedly interfering with the end of the saddle.

Further, between the first seat 310 and the second seat 320 are disposed a ventilation portion 302 communicating with the ischium accommodation portion 301 and allowing external air to flow therethrough and a gap 303 preventing the coccyx from coming into contact with the saddle seat 300.

That is, the ventilation portion 302 and the gap 303 are formed by the space in which the first seat 310 and the second seat 320 are spaced apart from each other, act as passages for naturally moving the air introduced into the saddle during riding backwardly, and provide ventilation effectiveness for the perineum and the surrounding regions thereof to allow the rider to enjoy the riding in pleasant conditions.

Further, the straight line portions 310b and 320b providing the ventilation portion 302 between the first seat 310 and the second seat 320 become gradually narrow in width toward the ends thereof from the ischium accommodation portion 301.

This suppresses the rider's inner thighs for pedaling the bicycle from frictionally coming into contact with the straight line portions 310b and 320b of the first seat 310 and the second seat 320 to the maximum.

Figure 4A:
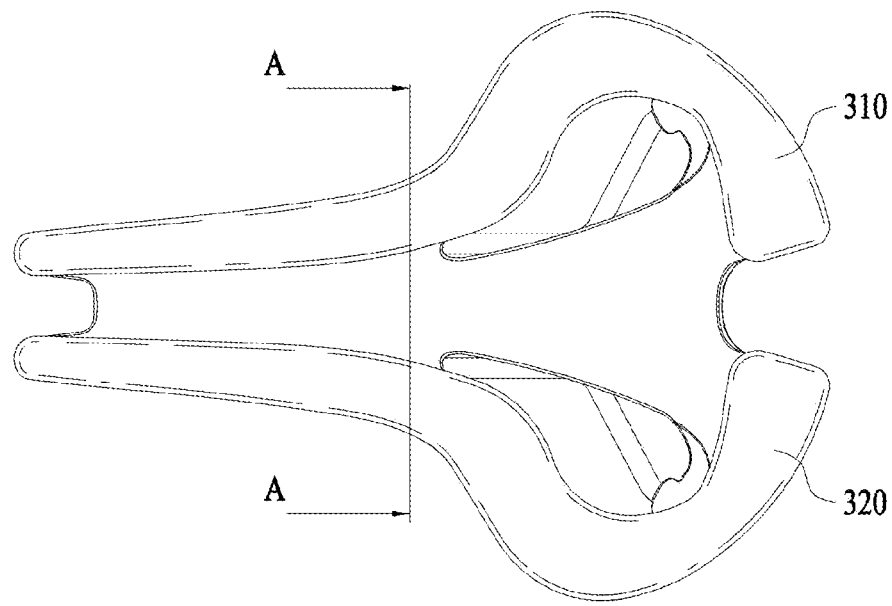
FIGS. 4a and 4b are plan and partially sectional views showing the bicycle saddle of FIG. 2.
Figure 4B:
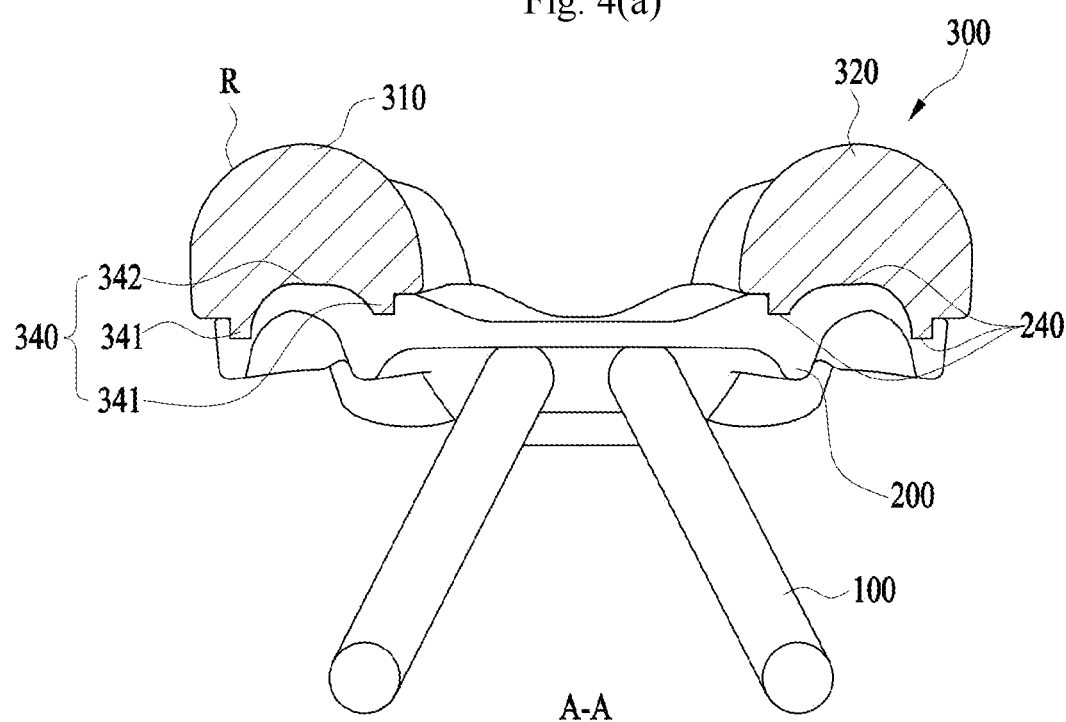
Figure 5:
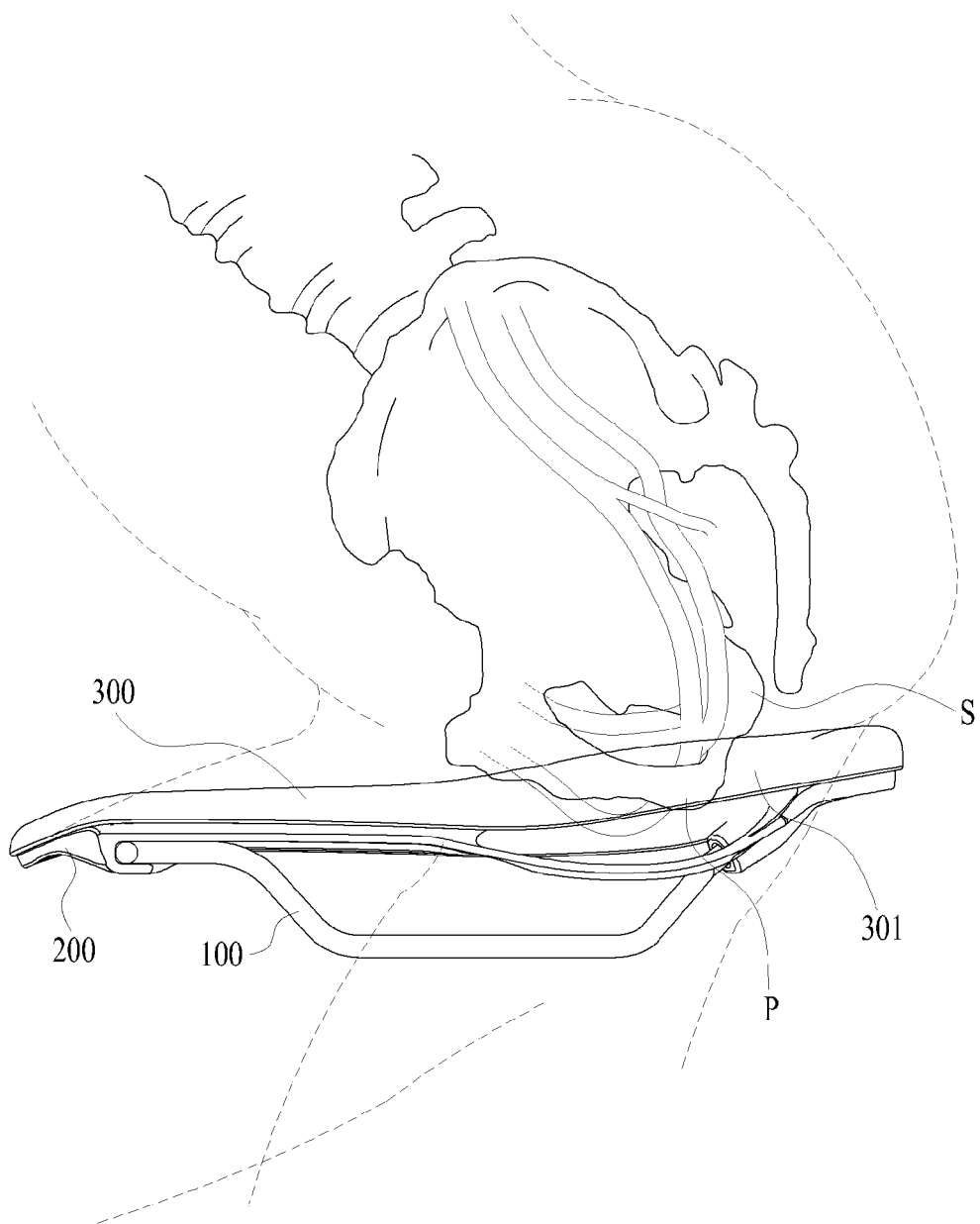
FIG. 5 is a schematic view showing a state where a user rides on the bicycle saddle according to the present invention.
Figure 6:
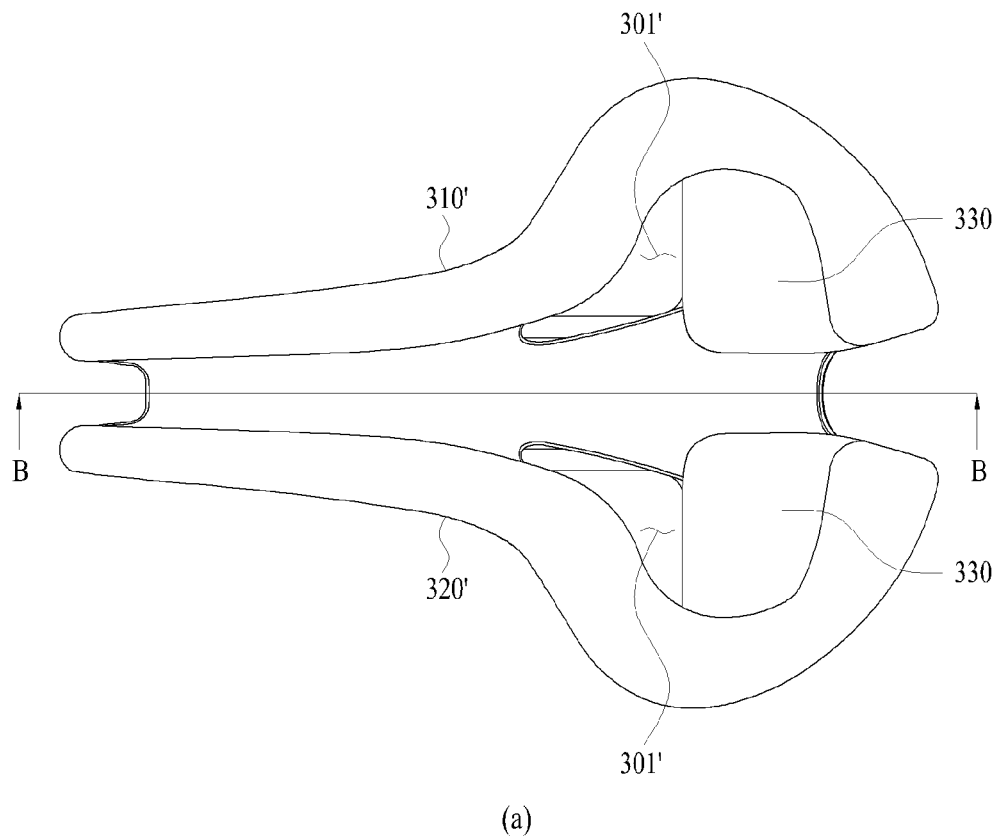
FIGS. 6a and 6b are plan and sectional views showing a bicycle saddle according to another embodiment of the present invention.
Figure 6:
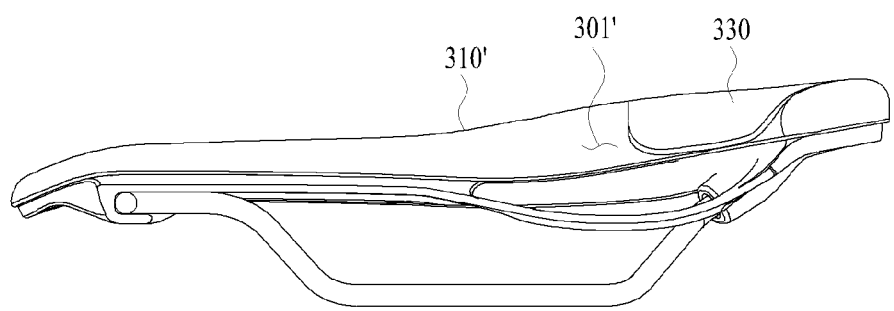

Further, as shown in FIGS. 4a and 4b, the first seat 310 and the second seat 320 are the rounded top portions with semicircles R curved to arch shapes, and they have fastening parts 340 formed on the undersides thereof to be detachably coupled correspondingly to the saddle plate 200.

In this case, each fastening part 340 includes a pair of fastening protrusions 341 protruding downwardly from both sides of the underside of each seat and a fastening groove 342 formed between the fastening protrusions 341. Of course, the saddle plate 200 has fastening parts 240 with corresponding coupling structures to the fastening parts 340 each having the fastening protrusions 341 and the fastening groove 342.

That is, the first seat 310 and the second seat 320 have the fastening parts 340 disposed on the undersides thereof, so that the saddle seat 300 can be conveniently and quickly disposed on top of the saddle plate, without using bolts or adhesives, thereby reducing the number of coupling processes and improving conveniences of maintenance.

FIGS. 6a and 6b are plan and sectional views showing a bicycle saddle according to another embodiment of the present invention, and as shown, the bicycle saddle may further include ischial tuberosity contacting portions 330 on one side of ischium accommodation portions 301' of a first seat 310' and a second seat 320', respectively, to increase contact areas of the first seat 310' and the second seat 320' with the rear sides S of the ischial tuberosities P.

That is, the ischial tuberosity contacting portions 330 decrease the spaces of the ischium accommodation portions 301', but increase the contact areas of the first seat 310' and the second seat 320' with the rear sides S of the ischial tuberosities P, thereby providing large areas comfortably supporting the rider's hips and the rear sides S of his or her ischial tuberosities P.

Further, the ischial tuberosity contacting portions 330 are inclinedly formed toward the bottom of the saddle plate 200 from tops of the first seat 310' and the second seat 320', respectively. Also, the ischial tuberosity contacting portions 330 are rounded to a given radius of curvature and become gradually narrow in width outwardly.

That is, the ischial tuberosity contacting portions 330 become surface-contacted with the rear sides S of his or her ischial tuberosities P to thus pressurize the rear sides S of his or her ischial tuberosities P in a process where the rider's ischial tuberosities enter the ischium accommodation portions 301' and are seated thereonto, so that the rider's hips can be stably contacted and fixed to the saddle seat 300 and comfortably supported against the saddle seat 300.

Moreover, the ischial tuberosity contacting portions 330 are desirably formed on the first seat 310' and the second seat 320', respectively, but they may be provided as one component connecting the first seat 310' and the second seat 320' with each other, without being limited thereto.

Each ischial tuberosity contacting portion 330 occupies an area less than or equal to % of the space area of the corresponding ischium accommodation portion 301' and has a plurality of holes (not shown) punched on the surface thereof to gently emit the heat generated from the rider's hips to the outside.

As mentioned above, the preferred embodiment of the present invention has been disclosed in the specification and drawings, and therefore, persons skilled in the relevant art can appreciate that many modifications and variations are possible in light of the above teachings. It is therefore intended that the scope of the invention be limited not by this detailed description, but rather by the claims appended hereto.

The invention claimed is:

1. A bicycle saddle comprising:
a saddle frame disposed on a bicycle frame;
a saddle plate disposed on top of the saddle frame and made of hard synthetic resin; and
a saddle seat disposed on top of the saddle plate to elastically support the hips,
wherein the saddle seat is divided into a first seat and a second seat having top portions rounded with a given radius of curvature, and the first seat and the second seat are disposed spaced apart from each other along the width direction of the saddle seat, and between the first seat and the second seat is disposed an arch-shaped ischium accommodation portion for accommodating the ischial tuberosities of the pelvis thereinto to prevent the arteries, veins, and nerves from a rider's anus to the genitals from being compressed against the saddle seat by his or her body weight,
wherein the first seat and the second seat each extend along edges of both sides of the saddle plate,
wherein a front part of the saddle seat comprises, between the first seat and the second seat, a ventilation portion for communicating with the ischium accommodation portion and allowing external air to flow therethrough, and rear end part of the saddle seat comprises a gap for preventing the coccyx from coming into contact with the saddle seat,
wherein the saddle plate has a pair of openings formed thereon to communicate with an ischium accommodation portion in the vertical direction, and the openings are formed on one side of the saddle plate and the other side with respect to a longitudinal central portion of the saddle plate, respectively, and rear end part of the saddle plate comprises a concave groove communicating with the gap in the vertical direction to prevent the coccyx from coming into contact with the saddle plate.

2. The bicycle saddle according to claim 1, wherein the first seat and the second seat have straight line portions reduced gradually in width toward ends thereof from the ischium accommodation portion to thus form the ventilation portion therebetween, and the ends of the straight line portions are bent downwardly.

3. The bicycle saddle according to claim 2, further comprising ischial tuberosity contacting portions formed on one side of the ischium accommodation portion, respectively, to increase contact areas of the first seat and the second seat with the rear sides of the ischial tuberosities, the ischial tuberosity contacting portions being inclinedly formed toward the bottom of the saddle plate from tops of the first seat and the second seat.

4. The bicycle saddle according to claim 3, wherein each ischial tuberosity contacting portion occupies an area less than or equal to ⅘ of the space area of the corresponding ischium accommodation portion and has a plurality of holes punched on the surfaces thereof.

5. The bicycle saddle according to claim 1, wherein the first seat and the second seat have the rounded top portions with the shape of a semicircularily curved arch and fastening parts formed on the undersides thereof, respectively, to be detachably coupled correspondingly to the saddle plate, each fastening part comprising a pair of fastening protrusions protruding downwardly from both sides of the underside of each seat and a fastening groove formed between the fastening protrusions.

* * * * *